Dec. 18, 1951   A. KLUDT   2,579,191
DEMOUNTABLE CLUTCH SHAFT
Filed Oct. 22, 1947
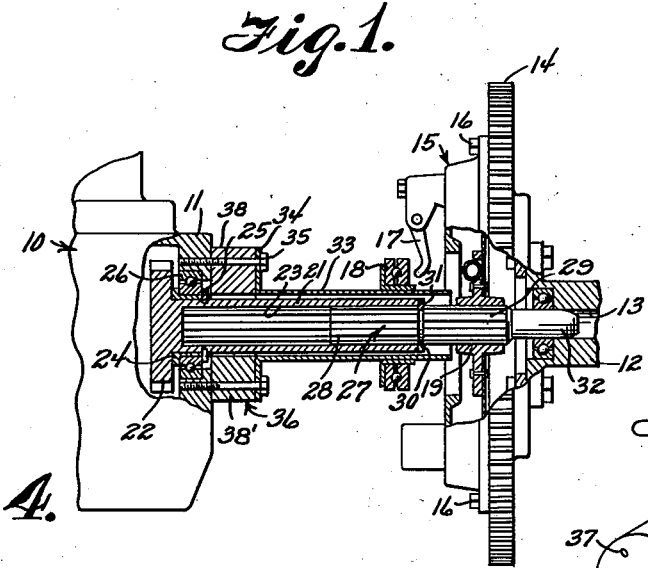
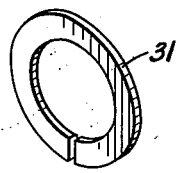
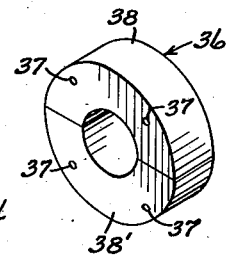
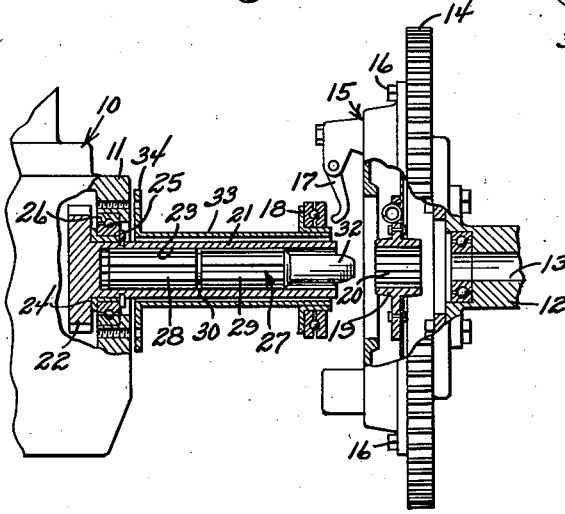
INVENTOR.
August Kludt
BY Victor J. Evans & Co.
ATTORNEYS Patented Dec. 18, 1951

2,579,191

UNITED STATES PATENT OFFICE 2,579,191

DEMOUNTABLE CLUTCH SHAFT

August Kludt, Sioux Falls, S. Dak.

Application October 22, 1947, Serial No. 781,344

1 Claim. (Cl. 192—110)

This invention relates to automotive vehicles, and more particularly to a clutch shaft for a vehicle.

The object of the invention is to provide a vehicle clutch shaft which is constructed so that the clutch can be readily and quickly adjusted or removed with a minimum of time and effort.

Another object of the invention is to provide a vehicle clutch shaft which is adapted to be interposed between the clutch and the transmission, and wherein the shaft includes a pair of telescopically arranged members whereby the shaft can be readily moved to a collapsed position so that the clutch can be removed for repair without the necessity of laboriously dismantling the vehicle floor board or the like.

A further object of the invention is to provide a vehicle clutch shaft which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the shaft, showing the normal position of the shaft in the vehicle, and with parts broken away and in section;

Figure 2 is a view similar to Figure 1, but showing the retracted position of the shaft, as when the clutch is to be removed;

Figure 3 is an enlarged perspective view of the spacer block;

Figure 4 is a perspective view of the split ring for maintaining the parts of the shaft in extended position.

Referring in detail to the drawings, the numeral 10 designates a conventional transmission which is a part of the vehicle, and the transmission includes a casing or housing 11. Arranged in spaced relation with respect to the casing 11 is a crank shaft 12 which is provided with a bore 13 therein. Connected to the crank shaft 12 is a fly wheel 14 which is provided with teeth on its peripheral surface and a clutch spring and pressure plate assembly 15 is connected to the fly wheel 14 by means of bolt and nut assemblies 16. The clutch assembly 15 is provided with the usual pressure fingers 17 which are actuated by the throw out bearing 18 in the usual manner. The clutch spring and pressure plate assembly 15 further includes a clutch plate having a hub 19 which is splined interiorly as at 20.

The present invention is directed to a shaft which connects the transmission 10 to the clutch spring and pressure plate assembly 15, and the shaft is constructed so that the clutch spring and pressure plate assembly can be readily removed from the vehicle when it is necessary to repair or replace the assembly with a minimum of effort and time and expense. The shaft includes a tubular sleeve 21 which projects through the transmission casing 11, and secured to the end of the sleeve 21 is a transmission gear 22. The transmission gear 22 may be formed integral with the sleeve 21. The sleeve 21 is provided with an open ended recess or bore 23 and the interior of the sleeve 21 is splined for a purpose to be later described. Arranged adjacent the transmission gear 22 and mounted on the sleeve 21 is an annular flange 24 which is held against longitudinal movement on the sleeve 21 by means of a snap ring 25. A ball bearing race 26 is supported on the flange 24 whereby the sleeve 21 is rotatably supported in the transmission casing 11.

Mounted for telescopic movement into and out of the open ended bore 23 is a body member 27. The body member 27 includes a first cylindrical section 28 which is splined exteriorly and is arranged in engagement with the interiorly splined bore 23 of the sleeve 21 so that the body member 27 and the sleeve 21 rotate in unison. The body member 27 further includes a second exteriorly splined section 29 which engages with the interiorly splined bore 20 of the hub 19 when the body member 27 is in its normal or extended position, as shown in Figure 1. The body member 27 is provided with an annular groove 30 which is arranged between the first section 27 and the second section 29 and a snap lock ring 31, Figure 1, is adapted to be positioned in the groove 30 for maintaining the body member 27 extended so that its second section 29 stays in contact with the hub 19. The body member 27 is further provided on its outer end with a bearing member 32 which rotatably seats in the bore 13 in the crank shaft 12 to help maintain the various parts in alignment.

Arranged in spaced surrounding relation with respect to the sleeve 21 is a housing 33 which includes a transverse flange 34. A plurality of bolts 35 project through the flange 34, and through a spacer block 36 and the bolts 35 are arranged in threaded engagement with the transmission casing 11 for maintaining the parts in assembled relation. The spacer block 36 includes a pair of semi-cylindrical sections 38 and 38' which are each provided with a plurality of openings 31 for the projection therethrough of the bolts 35.

In use, the parts of the shaft are normally in the position shown in Figure 1. Thus, the crank shaft 12 rotates the hub 19 and this causes the body member 27 to rotate since the section 29 is splined to the bore 20 of the hub 19. This rotation of the body member 27 causes the sleeve 21 to rotate, since the second section 28 is splined to the interiorly splined bore 23 of the sleeve 21 and rotation of the sleeve 21 causes the transmission gear 22 to rotate and the transmission gear 22 serves to drive or actuate the differential in the usual manner. When it is necessary to remove or repair the clutch 15, the bolts 35 are first removed and then the parts 38 and 38' of the spacer block 36 are moved out of the way. Then, the housing 33 is moved from the position of Figure 1 to the position shown in Figure 2 and next, the ring 31 is disengaged from the groove 30. Then, the body member 27 is telescoped or slid into the open ended bore 23 in the sleeve 21 so that it assumes the position shown in Figure 2. Now, the bolts 16 can be removed and the entire clutch 15 can drop out for repair or replacement.

The shaft of the present invention can be of various sizes, depending on the vehicle in which it is being used. The present invention enables the clutch assembly 15 to be removed without removing the transmission. The clutch 15 can be changed in a very few minutes by means of the present setup whereas when the conventional one-piece shaft is used for connecting the crank shaft to the transmission, the job of changing the clutch is very laborious and expensive. Further, it is not necessary to remove the transmission, or the drive shaft, or take up the vehicle floor board.

What I claim:

In a vehicle, the combination with a transmission including a casing, and a clutch including a clutch plate having an interiorly splined hub, of a shaft interposed between said transmission and clutch and adapted to be shifted longitudinally when it is necessary to remove or repair said clutch plate, said shaft including an interiorly splined sleeve projecting from said transmission casing and a body member, said splined sleeve being provided with an open end, a gear arranged within said casing and secured to the end of said sleeve, an annular flange arranged adjacent said gear and mounted on said sleeve, a ball bearing race positioned on said flange and providing a rotatable connection between said sleeve and casing, said body member mounted for telescopic movement into said sleeve through the open end thereof, said body member including an exteriorly splined first section arranged in engagement with said interiorly splined sleeve, an exteriorly splined second section adapted to be arranged in engagement with said interiorly splined hub when said body member is in its extended position, and a snap lock ring for maintaining said body member in its extended position.

AUGUST KLUDT.

REFERENCES CITED

The following references are of record in the file of this patent:

UNITED STATES PATENTS

| Number | Name | Date |
|---|---|---|
| 1,455,460 | Turnbull | May 15, 1923 |
| 1,538,034 | Frey | May 19, 1925 |
| 1,821,127 | Vandeveer | Sept. 1, 1931 |
| 1,900,305 | Schoenrock | Mar. 7, 1933 |